United States Patent
Ichikawa

(10) Patent No.: US 9,536,655 B2
(45) Date of Patent: Jan. 3, 2017

(54) WIRELESS POWER FEEDING APPARATUS, VEHICLE, AND METHOD OF CONTROLLING WIRELESS POWER FEEDING SYSTEM

(75) Inventor: Shinji Ichikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 13/504,806

(22) PCT Filed: Dec. 1, 2010

(86) PCT No.: PCT/JP2010/071439
§ 371 (c)(1),
(2), (4) Date: Apr. 27, 2012

(87) PCT Pub. No.: WO2012/073349
PCT Pub. Date: Jun. 7, 2012

(65) Prior Publication Data
US 2013/0234503 A1 Sep. 12, 2013

(51) Int. Cl.
*H01F 38/14* (2006.01)
*H02J 5/00* (2016.01)
(Continued)

(52) U.S. Cl.
CPC ............. *H01F 38/14* (2013.01); *B60L 11/126* (2013.01); *B60L 11/182* (2013.01);
(Continued)

(58) Field of Classification Search
CPC .................................. H01F 38/14; H02J 5/005
(Continued)

(56) References Cited

U.S. PATENT DOCUMENTS 4,800,328 A * 1/1989 Bolger et al. ................. 320/106
5,461,298 A 10/1995 Lara et al.
(Continued)

FOREIGN PATENT DOCUMENTS

AU 2006269374 B2 1/2007
AU 2006269374 C1 1/2007
(Continued)

OTHER PUBLICATIONS

International Search Report mailed Mar. 15, 2011 issued in International Patent Application No. PCT/JP2010/071439 (with translation).
(Continued)

*Primary Examiner* — Rexford Barnie
*Assistant Examiner* — Elim Ortiz
(74) *Attorney, Agent, or Firm* — Oliff PLC

(57) ABSTRACT

A power supply device generates power having a prescribed frequency. A primary self-resonant coil transmits the power in a contactless manner to a secondary self-resonant coil by resonating with the secondary self-resonant coil through an electromagnetic field. A power sensor detects reflected power to the power supply device. A communication device receives a power receiving state of a vehicle. An ECU estimates a positional mismatch amount of the secondary self-resonant coil relative to the primary self-resonant coil based on the power receiving state of the vehicle and the reflected power, by using relation obtained in advance between the power receiving state and the reflected power, and the positional mismatch amount.

12 Claims, 5 Drawing Sheets

(51) Int. Cl.
*B60L 11/12* (2006.01)
*B60L 11/18* (2006.01)
*H02J 7/02* (2016.01)

(52) U.S. Cl.
CPC ....... *B60L 11/1833* (2013.01); *B60L 11/1861* (2013.01); *H02J 5/005* (2013.01); *B60L 2210/30* (2013.01); *B60L 2240/547* (2013.01); *B60L 2240/549* (2013.01); *H02J 7/025* (2013.01); *Y02T 10/6217* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/16* (2013.01)

(58) Field of Classification Search
USPC ................................................. 307/9.1, 104
See application file for complete search history.

(56) References Cited

U.S. PATENT DOCUMENTS

| | | | |
|---|---|---|---|
| 5,617,003 A | 4/1997 | Odachi et al. | |
| 5,654,621 A | 8/1997 | Seelig | |
| 5,703,461 A | 12/1997 | Minoshima et al. | |
| 5,821,731 A | 10/1998 | Kuki et al. | |
| 5,850,135 A | 12/1998 | Kuki et al. | |
| 6,014,597 A | 1/2000 | Kochanneck | |
| 6,032,110 A | 2/2000 | Ishihara et al. | |
| 6,223,847 B1 | 5/2001 | Shimizu et al. | |
| 6,934,603 B1 | 8/2005 | Kochanneck | |
| 7,602,143 B2 | 10/2009 | Capizzo | |
| 7,741,734 B2 | 6/2010 | Joannopoulos et al. | |
| 7,880,337 B2 | 2/2011 | Farkas | |
| 8,008,888 B2* | 8/2011 | Oyobe et al. | 320/108 |
| 8,033,349 B2 | 10/2011 | Ortmann et al. | |
| 8,169,340 B2 | 5/2012 | Oyobe et al. | |
| 8,178,995 B2 | 5/2012 | Amano et al. | |
| 8,319,376 B2 | 11/2012 | Kitamura et al. | |
| 8,378,524 B2* | 2/2013 | Mita | 307/104 |
| 8,466,654 B2 | 6/2013 | Cook et al. | |
| 8,483,899 B2 | 7/2013 | Martin | |
| 8,729,735 B2 | 5/2014 | Urano | |
| 9,114,719 B1 | 8/2015 | Failing | |
| 9,160,176 B2 | 10/2015 | Fukushima | |
| 9,385,558 B2 | 7/2016 | Kawasaki | |
| 2002/0149673 A1 | 10/2002 | Hirama et al. | |
| 2004/0267420 A1 | 12/2004 | Tanaka et al. | |
| 2005/0264432 A1 | 12/2005 | Tanaka et al. | |
| 2006/0180362 A1 | 8/2006 | Yamaguchi et al. | |
| 2007/0042729 A1* | 2/2007 | Baaman | H02J 5/005 455/127.1 |
| 2007/0131505 A1 | 6/2007 | Kim | |
| 2007/0222542 A1 | 9/2007 | Joannopoulos et al. | |
| 2008/0265684 A1 | 10/2008 | Farkas | |
| 2008/0278264 A1 | 11/2008 | Karalis et al. | |
| 2009/0040068 A1 | 2/2009 | Oyobe et al. | |
| 2009/0045773 A1 | 2/2009 | Pandya et al. | |
| 2009/0096413 A1* | 4/2009 | Partovi | H01F 5/003 320/108 |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267558 A1 | 10/2009 | Jung | |
| 2009/0267709 A1 | 10/2009 | Joannopoulos et al. | |
| 2009/0267710 A1 | 10/2009 | Joannopoulos et al. | |
| 2009/0299918 A1 | 12/2009 | Cook et al. | |
| 2009/0313174 A1 | 12/2009 | Hafner et al. | |
| 2010/0045114 A1 | 2/2010 | Sample et al. | |
| 2010/0052431 A1* | 3/2010 | Mita | 307/104 |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0117596 A1 | 5/2010 | Cook et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0161217 A1 | 6/2010 | Yamamoto | |
| 2010/0171367 A1 | 7/2010 | Kitamura et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0187913 A1 | 7/2010 | Smith et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0225271 A1 | 9/2010 | Oyobe et al. | |
| 2010/0231053 A1 | 9/2010 | Karalis et al. | |
| 2010/0235006 A1 | 9/2010 | Brown | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0095618 A1* | 4/2011 | Schatz | H03H 7/40 307/104 |
| 2011/0127846 A1 | 6/2011 | Urano | |
| 2011/0241440 A1* | 10/2011 | Sakoda et al. | 307/104 |
| 2011/0248674 A1* | 10/2011 | Baarman | H02J 7/025 320/108 |
| 2011/0254503 A1 | 10/2011 | Widmer et al. | |
| 2012/0001485 A1* | 1/2012 | Uchida | H02J 5/005 307/11 |
| 2012/0007549 A1* | 1/2012 | Murayama | H02J 7/025 320/108 |
| 2012/0043172 A1 | 2/2012 | Ichikawa | |
| 2012/0091959 A1 | 4/2012 | Martin et al. | |
| 2012/0098348 A1 | 4/2012 | Inoue et al. | |
| 2012/0098483 A1 | 4/2012 | Patel | |
| 2012/0217819 A1 | 8/2012 | Yamakawa et al. | |
| 2013/0020862 A1 | 1/2013 | Miller | |
| 2013/0038715 A1 | 2/2013 | Ichikawa | |
| 2014/0035391 A1* | 2/2014 | Kitani | H02J 5/005 307/104 |
| 2015/0306966 A1 | 10/2015 | Ichikawa | |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101277838 A | 10/2008 |
| CN | 101682216 A | 3/2010 |
| CN | 101860089 A | 10/2010 |
| DE | 102008046215 A1 | 9/2009 |
| EP | 0986034 A2 | 3/2000 |
| EP | 1 902 505 A2 | 3/2008 |
| EP | 1930203 A1 | 6/2008 |
| EP | 2 130 287 A1 | 12/2009 |
| IN | 735/DELNP/2008 | 5/2008 |
| IN | 6195/DELNP/2009 | 7/2010 |
| JP | H09-102329 A | 4/1997 |
| JP | H09-213378 A | 8/1997 |
| JP | H09-215211 A | 8/1997 |
| JP | H10-117407 A | 5/1998 |
| JP | H11-001177 A | 1/1999 |
| JP | 2004-229425 A | 8/2004 |

(56) References Cited

FOREIGN PATENT DOCUMENTS

| | | |
|---|---|---|
| JP | 2004-291865 A | 10/2004 |
| JP | 2005-080324 A | 3/2005 |
| JP | 2006-288034 A | 10/2006 |
| JP | 2007097345 A | 4/2007 |
| JP | 2007-159359 A | 6/2007 |
| JP | 2008-174102 A | 7/2008 |
| JP | A-2009-501510 | 1/2009 |
| JP | 2009-106136 A | 5/2009 |
| JP | A-2010-63245 | 3/2010 |
| JP | A-2010-119246 | 5/2010 |
| JP | A-2010-141976 | 6/2010 |
| JP | A-2010-183813 | 8/2010 |
| JP | A-2010-206866 | 9/2010 |
| JP | A-2010-252446 | 11/2010 |
| JP | 2011-182608 A | 9/2011 |
| KR | 2008-0031398 A | 4/2008 |
| KR | 2010-0015954 A | 2/2010 |
| RU | 2297928 C1 | 4/2007 |
| WO | 03/055734 A1 | 7/2003 |
| WO | WO 2007/008646 A2 | 1/2007 |
| WO | WO 2008/118178 A1 | 10/2008 |
| WO | WO 2009054221 A1 * | 4/2009 |
| WO | WO 2010067763 A1 * | 6/2010 |

OTHER PUBLICATIONS

May 22, 2012 Japanese Office Action issued in Japanese Patent Application No. 2012-515043 (with translation).
Kurs et al.; "Wireless Power Transfer via Strongly Coupled Magnetic Resonances;" Science; Jul. 6, 2007; pp. 83-86; vol. 317.
Apr. 13, 2012 Office issued in U.S. Appl. No. 12/992,958.
Jan. 4, 2013 Office Action issued in U.S. Appl. No. 12/992,958.
Jun. 12, 2013 Office Action issued in U.S. Appl. No. 12/992,958.
Mar. 21, 2014 Notice of Allowance issued in U.S. Appl. No. 12/992,958.
Jun. 2, 2015 Office Action issued in U.S. Appl. No. 14/324,830.
Jul. 14, 2016 Office Action issued in U.S. Appl. No. 14/324,830.
Dec. 15, 2015 Office Action issued in U.S. Appl. No. 14/324,830.

* cited by examiner

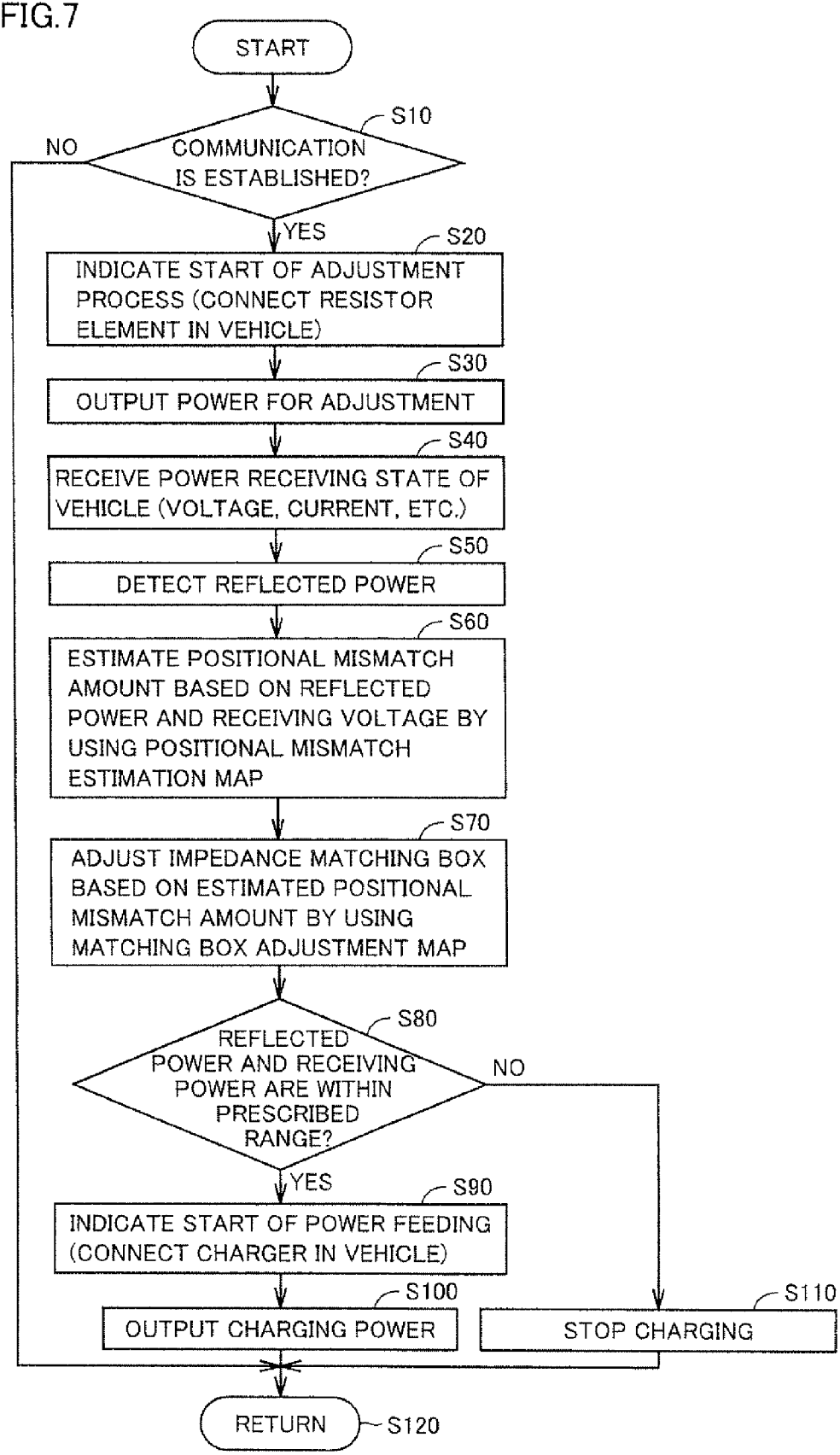

WIRELESS POWER FEEDING APPARATUS, VEHICLE, AND METHOD OF CONTROLLING WIRELESS POWER FEEDING SYSTEM

TECHNICAL FIELD

The present invention relates to a wireless power feeding apparatus, a vehicle, and a method of controlling a wireless power feeding system, and more particularly to a wireless power feeding apparatus for feeding power in a contactless manner by resonance between a power transmission unit and a power reception unit through an electromagnetic field, a vehicle receiving the power from the apparatus, and a method of controlling a wireless power feeding system.

BACKGROUND ART

Electrically powered vehicles such as electric vehicles and hybrid vehicles have attracted a lot of attention as environmentally friendly vehicles. These vehicles incorporate a motor for generating a driving force for running, and a rechargeable power storage device for storing power supplied to the motor. A hybrid vehicle is a vehicle incorporating a motor as well as an internal combustion engine as a driving source, a vehicle incorporating a power storage device as well as a fuel cell as a direct current power supply for driving the vehicle, or the like.

As with an electric vehicle, a hybrid vehicle having a vehicle-mounted power storage device that can be charged from a power supply outside of the vehicle is known. For example, a so-called "plug-in hybrid vehicle" is known in which a power storage device can be charged from a power supply at an ordinary household by connecting a power supply outlet provided at the house to a charging inlet provided on the vehicle by a charging cable.

Wireless power transmission without using a power cord or a power transmission cable has been receiving attention in recent years as a power transmission method. Power transmission using electromagnetic induction, power transmission using a microwave, and power transmission by resonance are three dominant techniques for wireless power transmission.

The resonance is a wireless power transmission technique for causing a pair of resonators (e.g., a pair of coils) to resonate with each other in an electromagnetic field (near field) to transmit power through the electromagnetic field, and can transmit a large amount of power of several kW across a relatively long distance (e.g., several meters).

Japanese Patent Laying-Open No. 2010-141976 (PTL 1) discloses a wireless power transmission apparatus for transmitting power in a contactless manner to a vehicle by resonance. This wireless power transmission apparatus includes an alternating current power source, a primary coil connected to the alternating current power source, a primary-side resonant coil, a secondary-side resonant coil, and a secondary coil connected to a load (secondary battery), and further includes an impedance varying circuit arranged between the alternating current power source and the primary coil. The primary coil, primary-side resonant coil, secondary-side resonant coil, secondary coil and load form a resonant system. An impedance of the impedance varying circuit is adjusted in such a manner that an input impedance of the resonant system at a resonant frequency matches with an impedance of the alternating current power source side excluding the primary coil.

According to this wireless power transmission apparatus, power can be efficiently supplied from the alternating current power source to the load without changing the frequency of the alternating current power source even if the distance between the resonant coils or the load receiving the power changes (see PTL 1).

CITATION LIST

Patent Literature

PTL 1: Japanese Patent Laying-Open No. 2010-141976
PTL 2: Japanese Patent Laying-Open No. 2010-119246

SUMMARY OF INVENTION

Technical Problem

If a positional mismatch of a secondary-side resonant coil relative to a primary-side resonant coil occurs, the impedance of a resonant system varies dues to the change in distance between the coils, resulting in lower power transmission efficiency from a power feeding apparatus to a vehicle. In the wireless power transmission apparatus disclosed in the above publication, a distance sensor measures the distance between the primary-side resonant coil and the secondary-side resonant coil, and the impedance varying circuit adjusts the impedance based on the measurement result.

However, because the distance sensor for measuring the distance between the primary-side resonant coil and the secondary-side resonant coil is separately provided, an increase in equipment cost results.

An object of the present invention, therefore, is to eliminate the need for a distance sensor for measuring a distance between a power transmission unit and a power reception unit in a wireless power feeding system for feeding power in a contactless manner by resonance between the power transmission unit and the power reception unit through an electromagnetic field.

Solution to Problem

According to the present invention, a wireless power feeding apparatus for feeding power in a contactless manner to a power reception device including a power reception unit includes a power supply device, a power transmission unit, a detection device, a communication device, and an estimation unit. The power supply device generates power having a prescribed frequency. The power transmission unit receives the power from the power supply device, and transmits the power in a contactless manner to the power reception unit by resonating with the power reception unit through an electromagnetic field. The detection device detects reflected power to the power supply device. The communication device receives a power receiving state of the power reception device. The estimation unit estimates a positional mismatch amount of the power reception unit relative to the power transmission unit based on the power receiving state and the reflected power, by using relation obtained in advance between the power receiving state and the reflected power, and the positional mismatch amount.

Preferably, the wireless power feeding apparatus further includes an impedance varying device and an impedance adjustment unit. The impedance varying device is provided between the power supply device and the power transmission unit. The impedance adjustment unit adjusts an impedance of the impedance varying device based on the positional mismatch amount, by using relation obtained in advance between the positional mismatch amount and the impedance.

Preferably, the power receiving state is indicated by a receiving voltage of the power reception device.

Preferably, the power receiving state is indicated by receiving power of the power reception device.

Preferably, the power reception device is configured to be able to fix an impedance during power reception to a prescribed value in accordance with a given instruction. The communication device further transmits the instruction for fixing the impedance to the prescribed value to the power reception device while the estimation unit estimates the positional mismatch amount.

Preferably, the power transmission unit includes a primary coil and a primary self-resonant coil, and the power reception unit includes a secondary self-resonant coil and a secondary coil. The primary coil receives the power from the power supply device. The primary self-resonant coil, to which power is fed from the primary coil by electromagnetic induction, generates the electromagnetic field. The secondary self-resonant coil receives power from the primary self-resonant coil by resonating with the primary self-resonant coil through the electromagnetic field. The secondary coil extracts the power received by the secondary self-resonant coil by electromagnetic induction for output.

Preferably, the power reception device is mounted on a vehicle.

According to the present invention, a vehicle capable of receiving power in a contactless manner from a power feeding apparatus including a power transmission unit includes a power reception unit, a detection device, a communication device, and an estimation unit. The power reception unit receives power in a contactless manner from the power transmission unit by resonating with the power transmission unit through an electromagnetic field. The detection device detects a power receiving state of the power reception unit. The communication device receives a detected value of reflected power in the power feeding apparatus. The estimation unit estimates a positional mismatch amount of the power reception unit relative to the power transmission unit based on the power receiving state and the reflected power, by using relation obtained in advance between the power receiving state and the reflected power, and the positional mismatch amount.

According to the present invention, a method of controlling a wireless power feeding system for feeding power in a contactless manner from a power feeding apparatus to a power reception device is provided. The power feeding apparatus includes a power supply device and a power transmission unit. The power supply device generates power having a prescribed frequency. The power transmission unit receives the power from the power supply device, and transmits the power in a contactless manner to a power reception unit in the power reception device by resonating with the power reception unit through an electromagnetic field. The method includes the steps of detecting reflected power to the power supply device, detecting a power receiving state of the power reception device, and estimating a positional mismatch amount of the power reception unit relative to the power transmission unit based on the power receiving state and the reflected power, by using relation obtained in advance between the power receiving state and the reflected power, and the positional mismatch amount.

Preferably, the power feeding apparatus further includes an impedance varying device provided between the power supply device and the power transmission unit. The control method further includes the step of adjusting an impedance of the impedance varying device based on the positional mismatch amount, by using relation obtained in advance between the positional mismatch amount and the impedance.

Advantageous Effects of Invention

According to the present invention, the positional mismatch amount of the power reception unit relative to the power transmission unit is estimated based on the power receiving state of the power reception device and the reflected power to the power supply device, thereby eliminating the need for a distance sensor for measuring the distance between the power transmission unit and the power reception unit.

BRIEF DESCRIPTION OF DRAWINGS

FIG. 7 is a flowchart for explaining a process executed by the ECU in the power feeding apparatus.

DESCRIPTION OF EMBODIMENTS

Figure 1:
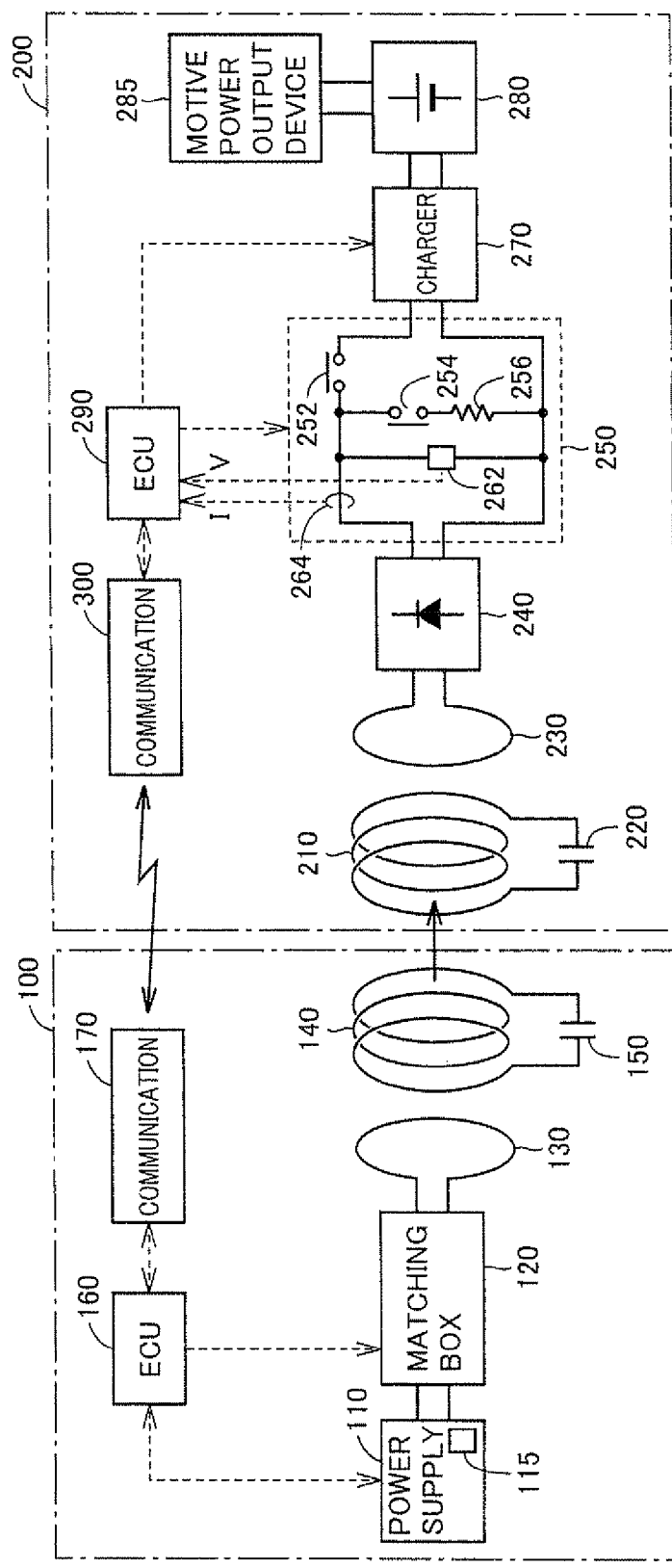
FIG. 1 is a general structural diagram of a wireless power feeding system according to an embodiment of the present invention.

Embodiments of the present invention will now be described in detail with reference to the drawings. It is noted that the same or corresponding parts are designated by the same reference characters in the drawings, and description thereof will not be repeated.

FIG. 1 is a general structural diagram of a wireless power feeding system according to an embodiment of the present invention. Referring to FIG. 1, this wireless power feeding system includes a power feeding apparatus 100 and a vehicle 200.

Power feeding apparatus 100 includes a power supply device 110, a power sensor 115, an impedance matching box 120, a primary coil 130, a primary self-resonant coil 140, a capacitor 150, an electronic control unit (hereinafter referred to as "ECU") 160, and a communication device 170.

Power supply device 110 generates power having a prescribed frequency. As an example, power supply device 110 receives power from a not-shown system power supply, and generates power having a prescribed frequency of between 1 MHz and a little more than 10 MHz. Power supply device 110 controls the generation and interruption of power and output power in accordance with an instruction received from ECU 160.

Power sensor 115 detects traveling wave power and reflected power in power supply device 110, and outputs the detected values to ECU 160. The traveling wave power is power output from power supply device 110. The reflected power is power output from power supply device 110 and reflected back to power supply device 110. A variety of known sensors capable of detecting the traveling wave power and the reflected power in the power supply device can be used as power sensor 115.

Impedance matching box 120 is provided between power supply device 110 and primary coil 130, and configured to be able to vary the inner impedance. Impedance matching box 120 varies the impedance in accordance with an instruction received from ECU 160, to match an input impedance of a resonant system including primary coil 130, primary self-resonant coil 140 and capacitor 150, and a secondary self-resonant coil 210, a capacitor 220 and a secondary coil 230 of vehicle 200 (described later) to an output impedance of power supply device 110.

Figure 2:
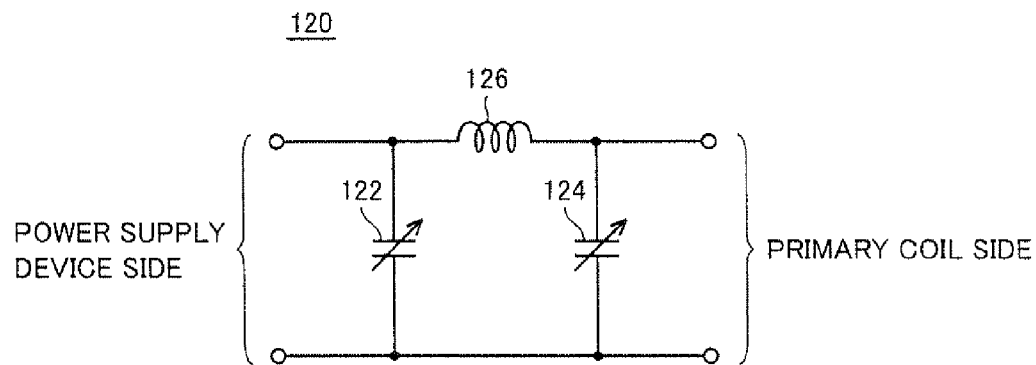
FIG. 2 is a circuit diagram illustrating an example of a circuit configuration of an impedance matching box shown in FIG. 1.

FIG. 2 is a circuit diagram illustrating an example of a circuit configuration of impedance matching box 120 shown in FIG. 1. Referring to FIG. 2, impedance matching box 120 includes variable capacitors 122, 124, and a coil 126. Variable capacitor 122 is connected in parallel to power supply device 110 (FIG. 1). Variable capacitor 124 is connected in parallel to primary coil 130 (FIG. 1). Coil 126 is connected on one of a pair of power lines provided between power supply device 110 and primary coil 130, between connection nodes of variable capacitors 122 and 124.

In impedance matching box 120, the impedance varies due to a change in capacity of at least one of variable capacitors 122 and 124 in accordance with an instruction received from ECU 160 (FIG. 1). In this manner, impedance matching box 120 matches the input impedance of the resonant system to the output impedance of power supply device 110 in accordance with the instruction received from ECU 160.

Although not specifically shown, coil 126 may be formed of a variable coil, and the impedance may be varied by varying the inductance of the variable coil.

Referring again to FIG. 1, primary coil 130 is provided substantially coaxially with primary self-resonant coil 140 at a prescribed distance from primary self-resonant coil 140. Primary coil 130 is magnetically coupled to primary self-resonant coil 140 by electromagnetic induction, and supplies high-frequency power supplied from power supply device 110 to primary self-resonant coil 140 by electromagnetic induction.

Primary self-resonant coil 140 receives the power from primary coil 130 by electromagnetic induction, and transmits the power to secondary self-resonant coil 210 (described later) mounted on vehicle 200 by resonating with secondary self-resonant coil 210 through an electromagnetic field. Primary self-resonant coil 140 is provided with capacitor 150. Capacitor 150 is connected between opposing ends of primary self-resonant coil 140, for example. The coil diameter and turns of primary self-resonant coil 140 and the capacity of capacitor 150 are designed as appropriate to attain a high Q value (e.g., Q>100), a high coupling factor κ and the like.

Primary coil 130 is provided to facilitate power feeding from power supply device 110 to primary self-resonant coil 140, and power supply device 110 may be directly connected to primary self-resonant coil 140 without providing primary coil 130. Alternatively, capacitor 150 may not be provided by utilizing a stray capacitance of primary self-resonant coil 140.

During power feeding from power feeding apparatus 100 to vehicle 200, ECU 160 receives the detected values of the reflected power and the traveling wave power from power sensor 115, and receives a power receiving state of vehicle 200 received by communication device 170 from communication device 170. The power receiving state of vehicle 200 includes information such as a receiving voltage, a receiving current and receiving power of vehicle 200. In addition to the power receiving state, ECU 160 also receives information about a state of charge (hereinafter referred to as "SOC") of a power storage device 280 (described later) mounted on vehicle 200, instructions for the start/completion of power feeding and the like from communication device 170.

ECU 160 then executes a prescribed process by software processing of executing a prestored program with a CPU (Central Processing Unit) and/or by hardware processing with a dedicated electronic circuit.

Specifically, ECU 160 controls the operation of power supply device 110. In addition, ECU 160 estimates a positional mismatch amount of secondary self-resonant coil 210 relative to primary self-resonant coil 140 (hereinafter simply referred to as "positional mismatch amount"), based on the power receiving state of vehicle 200 and the reflected power to power supply device 110. Primary self-resonant coil 140 and secondary self-resonant coil 210 are provided such that their central axes are parallel with each other, and an offset amount of the central axis of secondary self-resonant coil 210 relative to the central axis of primary self-resonant coil 140 is referred to as "positional mismatch amount." ECU 160 adjusts the impedance of impedance matching box 120 based on the estimated positional mismatch amount. These process steps will be described later in detail.

Communication device 170 is a communication interface for conducting communications with vehicle 200. Communication device 170 receives the power receiving state of vehicle 200 and the information such as the SOC of power storage device 280 from vehicle 200, for output to ECU 160. In addition, communication device 170 receives an instruction for the start of a series of process steps including the estimation of the positional mismatch amount and impedance adjustment (hereinafter simply referred to as "adjustment process"), and an instruction for the start of substantial power feeding for charging power storage device 280 from ECU 160, for transmission to vehicle 200.

Vehicle 200 includes secondary self-resonant coil 210, capacitor 220, secondary coil 230, a rectifier 240, a switching device 250, a charger 270, power storage device 280, and a motive power output device 285. Vehicle 200 further includes a voltage sensor 262, a current sensor 264, an ECU 290, and a communication device 300.

Secondary self-resonant coil 210 receives power from primary self-resonant coil 140 in power feeding apparatus 100 by resonating with primary self-resonant coil 140 through an electromagnetic field. Secondary self-resonant coil 210 is provided with capacitor 220. Capacitor 220 is connected between opposing ends of secondary self-resonant coil 210, for example. The coil diameter and turns of secondary self-resonant coil 210 and the capacity of capacitor 220 are designed as appropriate to attain a high Q value (e.g., Q>100), a high coupling factor κ and the like.

Secondary coil 230 is provided substantially coaxially with secondary self-resonant coil 210 at a prescribed distance from secondary self-resonant coil 210. Secondary coil 230 can be magnetically coupled to secondary self-resonant coil 210 by electromagnetic induction, and extracts the power received by secondary self-resonant coil 210 by electromagnetic induction, for output to rectifier 240.

Secondary coil 230 is provided to facilitate the extraction of power from secondary self-resonant coil 210, and rectifier 240 may be directly connected to secondary self-resonant coil 210 without providing secondary coil 230. Alternatively, capacitor 220 may not be provided by utilizing a stray capacitance of secondary self-resonant coil 210.

Rectifier 240 rectifies the power (alternating current) output from secondary coil 230. Charger 270 converts the voltage of direct current power output from rectifier 240 to a charging voltage of power storage device 280, for output to power storage device 280. Power storage device 280 is a rechargeable direct current power supply, and formed of a secondary battery such as a lithium-ion battery or a nickel-metal hydride battery. Power storage device 280 stores the power received from charger 270, and also stores regenerative power generated by motive power output device 285. Power storage device 280 then supplies the stored power to motive power output device 285. A capacitor having a large capacity can be employed as power storage device 280.

Motive power output device 285 generates a driving force for running of vehicle 200 by using the power stored in power storage device 280. Although not specifically shown, motive power output device 285 includes an inverter for receiving power from power storage device 280, a motor driven by the inverter, drive wheels driven by the motor and the like, for example. Motive power output device 285 may include a power generator for charging power storage device 280, and an engine capable of driving the power generator.

Switching device 250 is provided between rectifier 240 and charger 270. Switching device 250 includes relays 252, 254, and a resistor element 256. Relay 252 is provided on a power line between rectifier 240 and charger 270. Relay 254 and resistor element 256 are connected in series between a pair of power lines between rectifier 240 and charger 270, closer to rectifier 240 relative to relay 252.

During charging of power storage device 280 by power feeding apparatus 100, relays 252 and 254 are turned on and off, respectively. During the adjustment process, on the other hand, relays 252 and 254 are turned off and on, respectively. Switching device 250 is to disconnect power storage device 280 whose impedance varies with the SOC and to connect resistor element 256 having a prescribed impedance, in order to estimate the positional mismatch amount and adjust the impedance with stability.

Voltage sensor 262 detects a receiving voltage V rectified by rectifier 240, and outputs the detected value to ECU 290. Current sensor 264 detects a receiving current I output from rectifier 240, and outputs the detected value to ECU 290.

ECU 290 receives the detected values of receiving voltage V and receiving current I from voltage sensor 262 and current sensor 264, respectively. ECU 290 also receives an instruction for the start of the adjustment process and an instruction for the start of charging of power storage device 280 from communication device 300. ECU 290 then controls the operation of switching device 250 and charger 270 in accordance with the instructions by software processing of executing a prestored program with a CPU and/or by hardware processing with a dedicated electronic circuit.

Communication device 300 is a communication interface for conducting communications with power feeding apparatus 100. Communication device 300 receives the power receiving state of vehicle 200 and the information such as the SOC of power storage device 280 from ECU 290, for transmission to power feeding apparatus 100. In addition, communication device 300 receives an instruction for the start of the adjustment process, and an instruction for the start of charging of power storage device 280, for output to ECU 290.

In this wireless power feeding system, power feeding apparatus 100 feeds power to vehicle 200 by resonance between primary self-resonant coil 140 and secondary self-resonant coil 210 through an electromagnetic field. During the power feeding from power feeding apparatus 100 to vehicle 200, the power receiving state is detected in vehicle 200, and the reflected power to power supply device 110 is detected in power feeding apparatus 100. Then, a positional mismatch amount is estimated based on the power receiving state of vehicle 200 and the reflected power. Further, based on the estimated positional mismatch amount, the impedance of impedance matching box 120 is adjusted such that the input impedance of the resonant system matches with the output impedance of power supply device 110.

Figure 3:
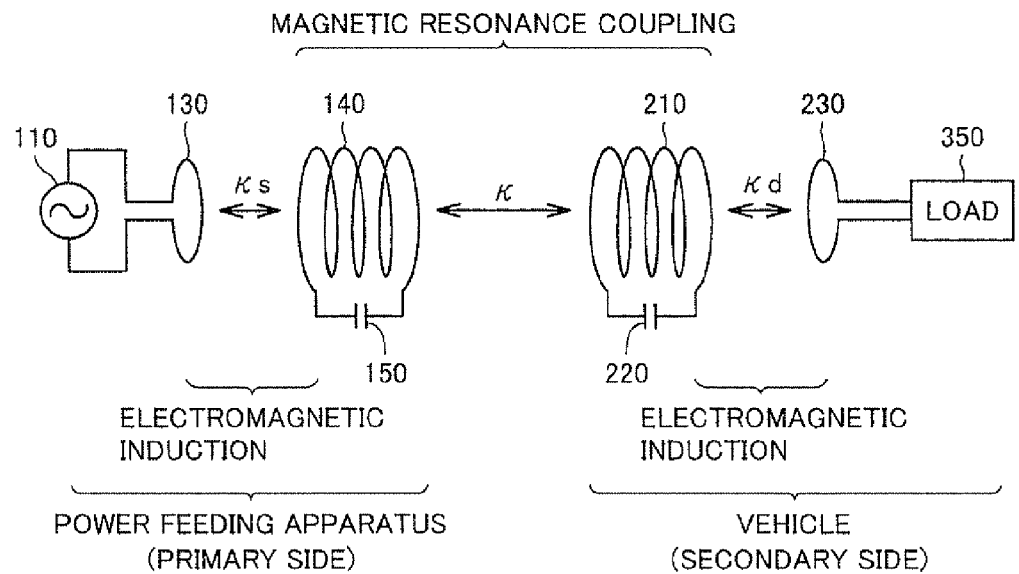
FIG. 3 is a diagram for explaining the principles of power transmission by resonance.

FIG. 3 is a diagram for explaining the principles of power transmission by resonance. Referring to FIG. 3, this resonance is such that, when two LC resonant coils having the same natural frequency resonate with each other in an electromagnetic field (near field) in the same way that two tuning forks resonate with each other, power is transmitted from one of the coils to the other coil through the electromagnetic field.

Specifically, primary coil 130 is connected to power supply device 110, and high-frequency power of between 1 MHz and a little more than 10 MHz is fed to primary self-resonant coil 140 magnetically coupled to primary coil 130 by electromagnetic induction. Primary self-resonant coil 140 forms an LC resonator together with capacitor 150, and resonates with secondary self-resonant coil 210 having a resonant frequency the same as that of primary self-resonant coil 140 through an electromagnetic field (near field). Consequently, energy (power) is transferred from primary self-resonant coil 140 to secondary self-resonant coil 210 through the electromagnetic field. The energy (power) transferred to secondary self-resonant coil 210 is extracted by secondary coil 230 magnetically coupled to secondary self-resonant coil 210 by electromagnetic induction, and supplied to a load 350 subsequent to rectifier 240 (FIG. 1). The power transmission by resonance is implemented when a Q value indicating the resonance strength of primary self-resonant coil 140 and secondary self-resonant coil 210 is higher than 100, for example.

Figure 4:
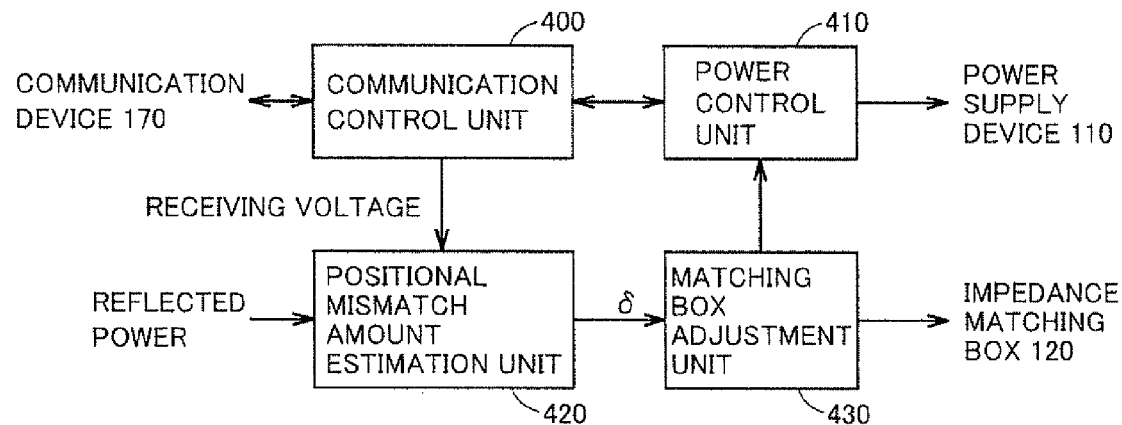
FIG. 4 is a functional block diagram of an ECU in a power feeding apparatus shown in FIG. 1.

FIG. 4 is a functional block diagram of ECU 160 in power feeding apparatus 100 shown in FIG. 1. Referring to FIG. 4, ECU 160 includes a communication control unit 400, a power control unit 410, a positional mismatch amount estimation unit 420, and a matching box adjustment unit 430.

Communication control unit 400 controls the communication between communication device 170 (FIG. 1) and vehicle 200. Specifically, communication control unit 400 establishes communication between communication device 170 and communication device 300 in vehicle 200. In addition, communication control unit 400 transmits an instruction for the start of the adjustment process prior to charging of power storage device 280 (FIG. 1) in vehicle 200 by power feeding apparatus 100, and an instruction for the start of substantial power feeding for charging power storage device 280 subsequent to the completion of the adjustment process, to vehicle 200 via communication device 170. Communication control unit 400 also receives the power receiving state of vehicle 200 and information about the SOC of power storage device 280, instructions for the start/completion of power feeding and the like, from vehicle 200 via communication device 170.

Power control unit 410 controls the power fed to vehicle 200 by controlling power supply device 110. During the adjustment process, power control unit 410 controls power supply device 110 to output power (power for adjustment) lower than that during the substantial power feeding for charging power storage device 280.

Positional mismatch amount estimation unit 420 estimates a positional mismatch amount δ of secondary self-resonant coil 210 relative to primary self-resonant coil 140, based on the receiving voltage included in the power receiving state received from vehicle 200 and the reflected power detected by power sensor 115 (FIG. 1).

Figure 5:
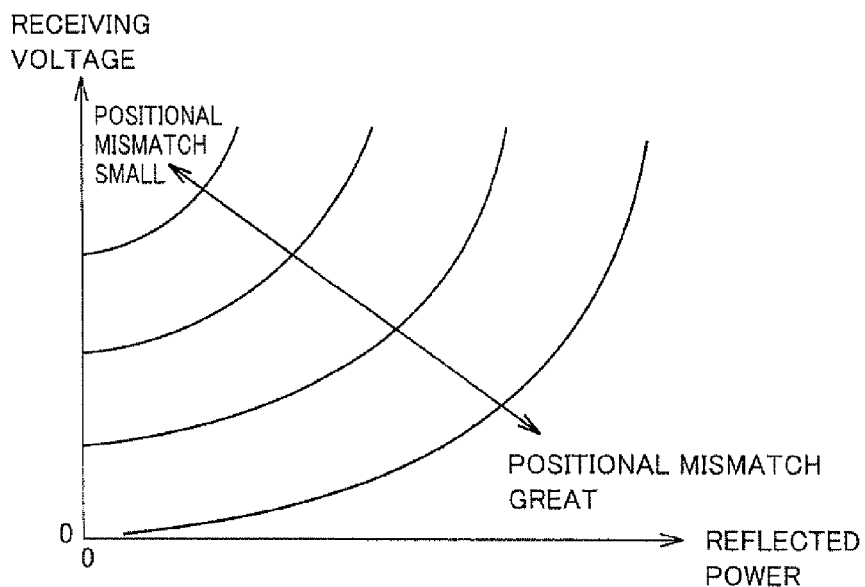
FIG. 5 is a diagram illustrating relation between a receiving voltage and reflected power, and a positional mismatch amount of a secondary self-resonant coil relative to a primary self-resonant coil.

FIG. 5 is a diagram illustrating relation between the receiving voltage and the reflected power, and the positional mismatch amount δ. Referring to FIG. 5, when the positional mismatch amount δ is small, the receiving voltage in vehicle 200 is high and the reflected power in power feeding apparatus 100 is low. When the positional mismatch amount δ is great, on the other hand, the receiving voltage is low and the reflected power is high.

Accordingly, a map or the like is prepared by obtaining in advance the relation between the receiving voltage and the reflected power, and the positional mismatch amount, and the positional mismatch amount δ is estimated based on the receiving voltage and the reflected power detected during power transmission from power feeding apparatus 100 to vehicle 200, by using the map or the like.

Although not specifically shown, receiving power can be used instead of the receiving voltage. That is, when the positional mismatch amount S is small, the receiving power in vehicle 200 is high and the reflected power in power feeding apparatus 100 is low. When the positional mismatch amount δ is great, on the other hand, the receiving power is low and the reflected power is high. Accordingly, a map or the like may be prepared by obtaining in advance the relation between the receiving power and the reflected power, and the positional mismatch amount, and the positional mismatch amount δ may be estimated based on the receiving power and the reflected power detected during power transmission from power feeding apparatus 100 to vehicle 200, by using the map or the like.

Referring again to FIG. 4, matching box adjustment unit 430 adjusts the impedance of impedance matching box 120 (FIGS. 1 and 2) to match the input impedance of the resonant system to the output impedance of power supply device 110, based on the positional mismatch amount δ estimated by positional mismatch amount estimation unit 420.

Figure 6:
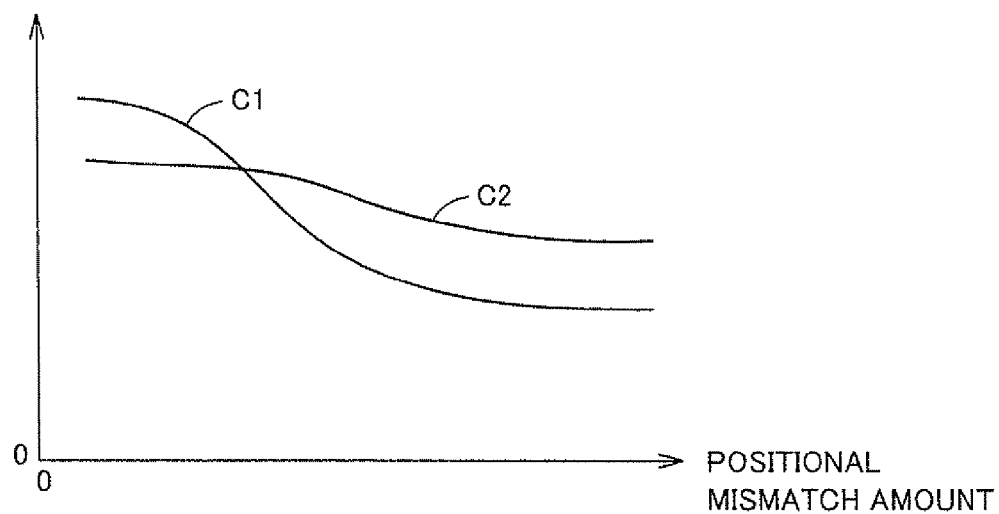
FIG. 6 is a diagram illustrating an example of relation between the positional mismatch amount of the secondary self-resonant coil relative to the primary self-resonant coil and an adjustment value of the impedance matching box.

FIG. 6 is a diagram illustrating an example of relation between the positional mismatch amount δ and an adjustment value of impedance matching box 120. Referring to FIG. 6, C1 and C2 represent adjustment values of variable capacitors 122 and 124 (FIG. 2), respectively. Adjustment values C1 and C2 vary in this manner with the positional mismatch amount δ.

Accordingly, a map or the like is prepared by obtaining in advance the relation between the positional mismatch amount δ and adjustment values C1, C2, and the impedance of impedance matching box 120 is adjusted based on the positional mismatch amount δ estimated based on the receiving voltage and the reflected power, by using the map or the like.

Referring again to FIG. 4, upon completion of the impedance adjustment, power control unit 410 controls power supply device 110 to perform substantial power feeding for charging power storage device 280 in vehicle 200.

FIG. 7 is a flowchart for explaining the process executed by ECU 160 in power feeding apparatus 100. Referring to FIG. 7, ECU 160 determines whether or not communication with vehicle 200 has been established (step S10). If the communication with vehicle 200 has not been established, the process proceeds to step S120 without execution of a series of subsequent steps.

If it is determined in step S10 that the communication with vehicle 200 has been established (YES in step S 10), ECU 160 transmits an instruction for the start of the adjustment process to vehicle 200 via communication device 170 (FIG. 1) (step S20). In vehicle 200, upon receiving this instruction, relays 252 and 254 (FIG. 1) are turned off and on, respectively. As a result, resistor element 256 is electrically connected, and power storage device 280 is electrically disconnected.

Then, upon receiving an answerback indicating that resistor element 256 has been connected, ECU 160 controls power supply device 110 to output the power for adjustment (step S30). This power for adjustment is prescribed power lower than that during the substantial power feeding for charging power storage device 280.

Next, ECU 160 receives the power receiving state (receiving voltage, receiving current, receiving power and the like) of the secondary side (vehicle) via communication device 170 (step S40). ECU 160 further receives the reflected power to power supply device 110 detected by power sensor 115 (FIG. 1) from power sensor 115 (step S50).

Then, ECU 160 estimates a positional mismatch amount δ based on the received receiving voltage and the detected reflected power, by using the map prepared in advance for estimating the positional mismatch amount, which indicates the relation between the receiving voltage of vehicle 200 and the reflected power in power feeding apparatus 100, and the positional mismatch amount (step S60). Further, ECU 160 adjusts impedance matching box 120 based on the positional mismatch amount δ estimated in step S60, by using the map prepared in advance for adjusting the matching box, which indicates the relation between the positional mismatch amount of secondary self-resonant coil 210 relative to primary self-resonant coil 140 and the adjustment value of impedance matching box 120 (step S70).

Next, ECU 160 determines whether or not the reflected power and the receiving power of vehicle 200 are within a prescribed range (step S80). This determination process is to determine whether or not the magnitudes of the reflected power and the receiving power are appropriate relative to the power output from power supply device 110 (traveling wave power).

If it is determined that the reflected power and the receiving power are within the prescribed range (YES in step S80), ECU 160 transmits an instruction for the start of substantial power feeding for charging power storage device 280 to vehicle 200 via communication device 170 (FIG. 1) (step S90). In vehicle 200, upon receiving this instruction, relays 252 and 254 are turned on and off, respectively. As a result, charger 270 is electrically connected to rectifier 240, and resistor element 256 is electrically disconnected. Then, ECU 160 controls power supply device 110 to output charging power for charging power storage device 280 (step S100).

If it is determined in step S80 that the reflected power and the receiving power are not within the prescribed range (NO in step S80), on the other hand, ECU 160 stops power supply device 110, and interrupts the charging of power storage device 280 by power feeding apparatus 100 (step S110).

As described above, in this embodiment, the positional mismatch amount δ of secondary self-resonant coil 210 relative to primary self-resonant coil 140 is estimated based on the power receiving state of vehicle 200 and the reflected power in power feeding apparatus 100. Therefore, this embodiment can eliminate the need for a distance sensor for measuring the distance between primary self-resonant coil 140 and secondary self-resonant coil 210.

In this embodiment, the impedance of impedance matching box 120 is adjusted based on the estimated positional mismatch amount δ. According to this embodiment, therefore, reduction in power transmission efficiency can be suppressed.

While ECU 160 in power feeding apparatus 100 estimates the positional mismatch amount δ in the above embodiment, ECU 290 in vehicle 200 may estimate the positional mismatch amount δ. In this case, a detected value of the reflected power is transmitted from power feeding apparatus 100 to vehicle 200, and an estimated result of the positional mismatch amount δ is transmitted from vehicle 200 to power feeding apparatus 100.

While the impedance of impedance matching box 120 is adjusted based on the estimated positional mismatch amount δ in the above description, the position of vehicle 200 relative to power feeding apparatus 100 may be adjusted based on the estimated positional mismatch amount δ.

While impedance matching box 120 is provided only in primary-side power feeding apparatus 100 in the above description, an impedance matching box may be provided in secondary-side vehicle 200. When an impedance matching box is provided in vehicle 200, a positional mismatch amount δ can be estimated based on the receiving voltage (or receiving power) and the reflected power, and the impedance matching box in vehicle 200 can be adjusted based on the estimated result, as in the above embodiment.

While power is transmitted by resonance between primary self-resonant coil 140 in power feeding apparatus 100 and secondary self-resonant coil 210 in vehicle 210 in the above description, the power transmission unit and the power reception unit may be formed of a pair of high dielectric disks. The high dielectric disks are made of a high dielectric constant material such as $TiO_2$, $BaTi_4O_9$ or $LiTaO_3$.

In the above description, primary coil 130, primary self-resonant coil 140 and capacitor 150 form an example of "power transmission unit" in the present invention, and secondary self-resonant coil 210, capacitor 220 and secondary coil 230 form an example of "power reception unit" in the present invention. Power sensor 115 corresponds to an example of "detection device for detecting reflected power" in the present invention, and ECU 160 (positional mismatch amount estimation unit 420) corresponds to an example of "estimation unit" in the present invention.

Further, impedance matching box 120 corresponds to an example of "impedance varying device" in the present invention, and ECU 160 (matching box adjustment unit 430) corresponds to an example of "impedance adjustment unit" in the present invention. Furthermore, voltage sensor 262 and current sensor 264 correspond to an example of "detection device for detecting a power receiving state" in the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100 power feeding apparatus; 110 power supply device; 115 power sensor; 120 impedance matching box; 122, 124 variable capacitor; 126 coil; 130 primary coil; 140 primary self-resonant coil; 150, 220 capacitor; 160, 290 ECU; 170, 300 communication device; 200 vehicle; 230 secondary coil; 240 rectifier; 250 switching device; 252, 254 relay; 256 resistor element; 262 voltage sensor; 264 current sensor; 270 charger; 280 power storage device; 285 motive power output device; 350 load; 400 communication control unit; 410 power control unit; 420 positional mismatch amount estimation unit; 430 matching box adjustment unit

The invention claimed is:

1. A wireless power feeding apparatus for feeding power in a contactless manner to a power reception device including a power reception unit, comprising:
    a power transmission unit for transmitting power to said power reception unit;
    an estimation unit for estimating a positional mismatch amount of said power reception unit relative to said power transmission unit, based on a power receiving state of said power reception device and reflected power in the wireless power feeding apparatus, by using a relation obtained in advance between the power receiving state and the reflected power, and the positional mismatch amount, wherein the positional mismatch amount is estimated using a map indicative a the relation between (i) the power receiving state and the reflected power and (ii) the positional mismatch amount;
    a detection device for detecting said reflected power; and
    a sensor for detecting the power receiving state in the power reception device.

2. The wireless power feeding apparatus according to claim 1, further comprising a power supply device for generating power for supply to said power transmission unit.

3. The wireless power feeding apparatus according to claim 1, wherein
    said power receiving state is a receiving voltage of said power reception device.

4. The wireless power feeding apparatus according to claim 1, wherein
    said power receiving state is receiving power of said power reception device.

5. The wireless power feeding apparatus according to claim 1, wherein
    said power reception device is configured to be able to fix an impedance during power reception to a prescribed value, and
    said impedance is fixed to said prescribed value while said estimation unit estimates said relative positional relation.

6. The wireless power feeding apparatus according to claim 1, wherein
    said power transmission unit includes
        a primary self-resonant coil for generating an electromagnetic field for transmitting power in a contactless manner to said power reception unit, and
        a primary coil for feeding power to said primary self-resonant coil by electromagnetic induction, and
    said power reception unit includes
        a secondary self-resonant coil for receiving the power from said primary self-resonant coil by resonating with said primary self-resonant coil through said electromagnetic field, and a secondary coil for extracting the power received by said secondary self-resonant coil by electromagnetic induction for output.

7. The wireless power feeding apparatus according to claim 1, wherein said power transmission unit includes a primary self-resonant coil for generating an electromagnetic field for transmitting power in a contactless manner to said power reception unit, and said power reception unit includes a secondary self-resonant coil for receiving the power from said primary self-resonant coil by resonating with said primary self-resonant coil through said electromagnetic field.

8. The wireless power feeding apparatus according to claim 1, further comprising a communication device for receiving the power receiving state of said power reception device from said power reception device.

9. The wireless power feeding apparatus according to claim 1, further comprising:

an impedance varying device capable of varying an impedance; and an impedance adjustment unit for adjusting an impedance of said impedance varying device based on the relative positional relation estimated by said estimation unit, by using relation obtained in advance between said relative positional relation and said impedance.

10. The wireless power feeding apparatus according to claim 1, wherein said power reception device is mounted on a vehicle.

11. A vehicle capable of receiving power in a contactless manner from a power feeding apparatus including a power transmission unit, comprising:

a power reception unit for receiving power in a contactless manner from said power transmission unit;

an estimation unit for estimating a positional mismatch amount of said power reception unit relative to said power transmission unit, based on a power receiving state of said power reception device and reflected power in said power feeding apparatus, by using a relation obtained in advance between the power receiving state and the reflected power, and the positional mismatch amount, wherein the positional mismatch amount is estimated using a map indicative of the relation between (i) the power receiving state and the reflected power and (ii) the positional mismatch amount;

a detection device for detecting said reflected power; and a sensor for detecting the power receiving state in the power reception device.

12. A method of controlling a wireless power feeding system for feeding power in a contactless manner from a power feeding apparatus to a power reception device, said power feeding apparatus including a power transmission unit for transmitting power to said power reception device, said power reception device including a power reception unit for receiving the power in a contactless manner from said power transmission unit, said method comprising the steps of:

detecting reflected power in said power feeding apparatus with a detection device;

detecting a power receiving state of said power reception device with a sensor; and estimating a positional mismatch amount of said power transmission unit relative to said power reception unit, based on said reflected power and said power receiving state, by using a relation obtained in advance between the power receiving state and the reflected power, and the positional mismatch amount, wherein the positional mismatch amount is estimated using a map indicative of the relation between (i) the power receiving state and the reflected power and (ii) the positional mismatch amount.

* * * * *